(12) United States Patent
Och

(10) Patent No.: US 6,874,241 B2
(45) Date of Patent: Apr. 5, 2005

(54) MEASURING SYSTEM FOR DETERMINING THE MEASUREMENT UNCERTAINTY OF MEASURING MACHINES IN THE COMPARISON OF GEARWHEELS WITH TOOTHING STANDARDS

(75) Inventor: Rudolf Och, Nürnberg (DE)

(73) Assignee: Frenco GmbH, Altdorf (DE)

( * ) Notice: Subject to any disclaimer, the term of this patent is extended or adjusted under 35 U.S.C. 154(b) by 0 days.

(21) Appl. No.: 10/732,289

(22) Filed: Dec. 11, 2003

(65) Prior Publication Data

US 2004/0117998 A1 Jun. 24, 2004

(30) Foreign Application Priority Data

Dec. 11, 2002 (DE) ......................................... 102 57 702

(51) Int. Cl.$^7$ ................................................ G01B 9/08
(52) U.S. Cl. ................................. 33/501.19; 33/501.16; 33/501.7
(58) Field of Search ........................... 33/501.7, 501.13, 33/501.14, 501.16, 501.19

(56) References Cited

U.S. PATENT DOCUMENTS

| | | | | |
|---|---|---|---|---|
| 1,027,418 A | * | 5/1912 | Heide | 33/501.4 |
| 1,956,812 A | * | 5/1934 | Smith | 33/199 B |
| 2,202,638 A | * | 5/1940 | Praeg | 33/501.16 |
| 2,656,614 A | * | 10/1953 | Mahr | 33/501.19 |
| 2,697,283 A | * | 12/1954 | Leuthold | 33/501.14 |
| 3,589,018 A | * | 6/1971 | Thompson et al. | 33/501.12 |
| 3,952,418 A | * | 4/1976 | Akamatsu et al. | 33/561 |
| 5,134,783 A | * | 8/1992 | Perry | 33/645 |
| 5,546,666 A | * | 8/1996 | Och | 33/501.7 |
| 5,901,454 A | * | 5/1999 | Stadtfeld et al. | 33/501.13 |
| 6,598,305 B1 | * | 7/2003 | McKinney et al. | 33/501.7 |
| 2002/0129506 A1 | * | 9/2002 | Han | 33/501.7 |

* cited by examiner

Primary Examiner—Christopher W. Fulton
Assistant Examiner—Travis Reis
(74) Attorney, Agent, or Firm—Sughrue Mion, PLLC

(57) ABSTRACT

Measuring means for determining measurement error factors of a measuring machine, which measures toothing tolerances of gearwheels by inserting two gauging balls in different tooth gaps of a gearwheel and then taking measurements from the positions of the inserted balls, comprises a reference master having two first helically extending grooves disposed on an external or internal circumference of the master and representing tooth gaps receiving the two gauging balls to permit simulated measurements applicable to an externally or internally helically toothed gearwheel with an even number of teeth and two second helically extending grooves disposed on the same circumference as the first grooves and representing tooth gaps for respectively receiving the two balls to permit simulated measurements applicable to an externally or internally helically toothed gearwheel with an uneven number of teeth. The first grooves extend in a first helix direction and are arranged diametrically opposite one another, whereas the second grooves extend in a second helix direction opposite to the first helix direction and are arranged on opposite sides of the circumference on two diameters which include an angle equal to half the pitch of the teeth of the uneven number.

4 Claims, 4 Drawing Sheets

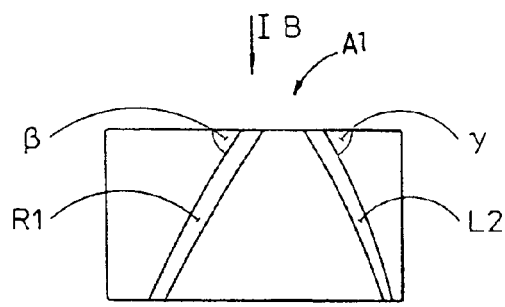
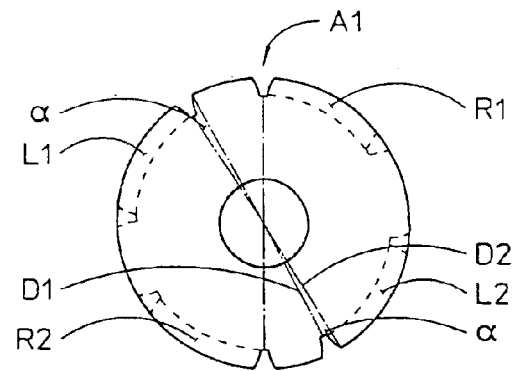
Fig. 1A
Fig. 1B
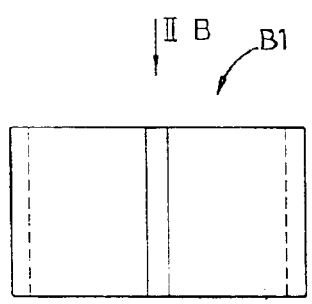
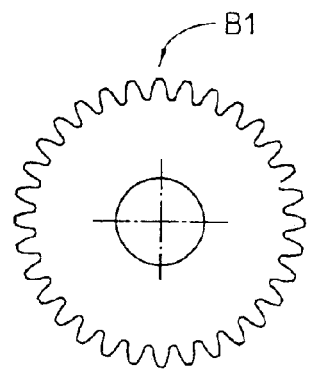
Fig. 2A
Fig. 2B

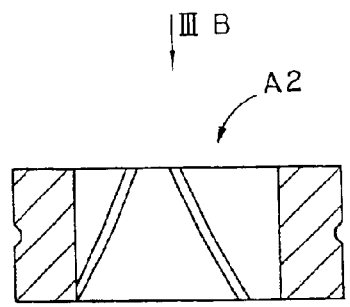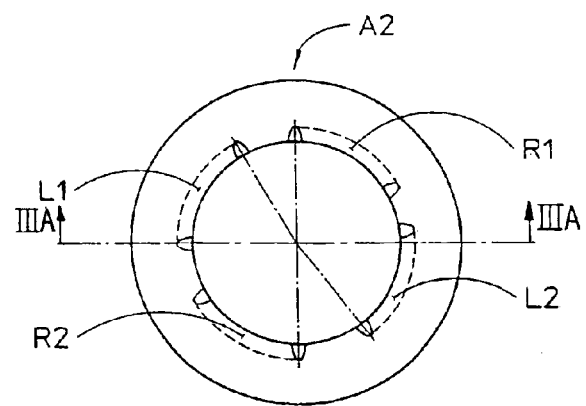
Fig. 3A                Fig. 3B
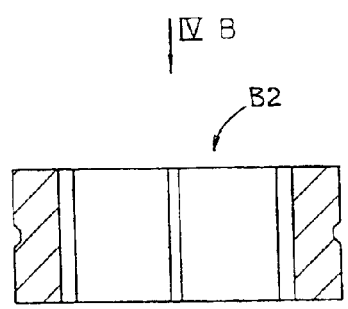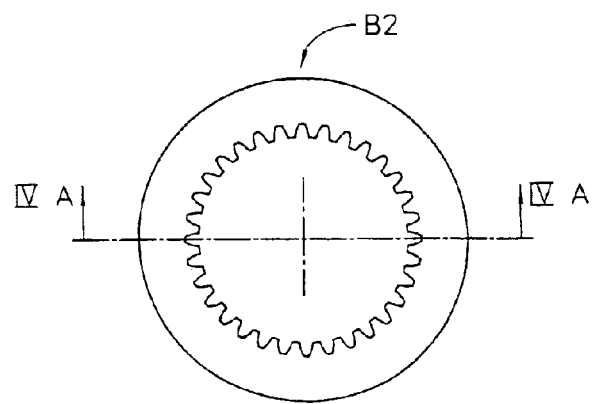
Fig. 4A                Fig. 4B

MEASURING SYSTEM FOR DETERMINING THE MEASUREMENT UNCERTAINTY OF MEASURING MACHINES IN THE COMPARISON OF GEARWHEELS WITH TOOTHING STANDARDS

The present invention relates to measuring means for determining measurement error factors of a measuring machine which measures toothing tolerances of gearwheels.

Known measuring machines for that purpose measure toothing tolerances of gearwheels by inserting gauging elements, particularly gauging balls, in different tooth gaps of a gearwheel and take measurements from the positions of the inserted elements. Measurements taken from positions of an individual inserted ball permit determination of tooth profile (deviation from a true involute defining profile) and tooth flank line (deviation from rectilinearity for a spur gearwheel or deviation from true helix angle for a helical gearwheel). Measurements taken from the positions or position relationships of two inserted balls permit determination, depending on the ball spacings around the gearwheel, of pitch (index deviation, i.e. differences in the angles between adjacent teeth), concentricity (run-out deviation, i.e. differences in spacing between gearwheel bore centre and a notional circumference) and size (deviations in diameter of a pitch or other notional circle, i.e. differences in the spacing of oppositely positioned, inserted balls measured between mutually remote points for an external toothing or between mutually adjacent points for an internal toothing). Such machines and measuring procedures are well-known and are described in, for example, U.S. Pat. Specification No. 5,546,666.

The machines themselves, however, are subject to measurement error, in particular uncertainty with regard to measuring accuracy. In practice it is known to carry out calibration test measurements on the machine to determine error factors with respect to the quality assessment parameters of tooth profile and tooth flank line. The determined factors can then be taken into account in the processing of measurements performed by the respective machine on test pieces (gearwheels) to be checked. It would be desirable, however, to also be able to conveniently carry out test measurements to determine error factors with respect to the other mentioned parameters of pitch, concentricity and size. In particular, such measurements should be able to be undertaken for helical gearwheels with an external or internal toothing and with an even or an uneven number of teeth.

It is therefore the principal object of the invention to provide measuring means by which measurement error factors of measuring machines, which serve for detecting toothing tolerances of gearwheels, may be readily determined. A subsidiary object is to enable determination of such factors by measuring means with no more than a minimum number of components for the range of error factors to be determined. Yet another subsidiary object is to provide measuring means to enable determination of measurement error factors in relation not only to helical gearwheels, but also to spur gearwheels.

According to the present invention there is provided measuring means for determining measurement error factors of a measuring machine which measures toothing tolerances of gearwheels by inserting two gauging elements in different tooth gaps of a gearwheel and the taking measurements from the positions of the inserted elements, the measuring means comprising a reference master having two first helically extending grooves disposed on one of an external circumference and an internal circumference of the master and representing tooth gaps for respectively receiving the two gauging elements to permit simulated measurements applicable to one of an externally helically toothed and an internally helically toothed gearwheel with an even number of teeth, the first grooves extending in a first helix direction and being arranged on opposite sides of the circumference on the same diameter, and two second helically extending grooves disposed on the same circumference as the first grooves and representing tooth gaps for respectively receiving the two gauging elements to permit simulated measurements applicable to one of an externally helically toothed and an internally helically toothed gearwheel with an uneven number of teeth, the second grooves extending in a second helix direction opposite to the first helix direction and being arranged on opposite sides of the circumference respectively on two diameters including therebetween a predetermined angle equal to half the pitch of the teeth of the uneven number.

The first helix direction may be a righthand helix direction and the second helix direction a lefthand helix direction. Alternatively, the first helix direction can be a lefthand helix direction and the second helix direction a righthand helix direction.

Preferably, the measuring means also comprises a further reference master having a spur toothing extending fully around one of an external circumference and an internal circumference thereof for reception of the gauging elements to permit simulated measurements applicable to one of an externally toothed and an internally toothed gearwheel with a spur toothing.

Embodiments of the present invention will now be more particularly described with reference to the accompanying drawings, in which:

FIG. 1A is a schematic side view of a reference master (A1) for use in determining measurement error factors of a gearwheel toothing measuring machine in relation to an external helical toothing with even or uneven numbers of teeth, viewed from the direction of the arrow IA of FIG. 1B;

FIG. 1B is a plan view of the master (A1) of FIG. 1A from the direction of the arrow IB of FIG. 1A;

FIG. 2A is a schematic side view of a reference master (B1) for use in determining measurement error factors of a gearwheel toothing measuring machine in relation to an external straight or spur toothing, viewed from the direction of the arrow IIA of FIG. 2B;

FIG. 2B is a plan view of the master (B1) of FIG. 2A from the direction of the arrow IIB of FIG. 2A;

FIG. 3A is a schematic cross-section of a reference master (A2) for use in determining measurement error factors of a gearwheel toothing measuring machine in relation to an internal helical toothing with even or uneven numbers of teeth, along the section line IIIA—IIIA of FIG. 3B;

FIG. 3B is a plan view of the master (A2) from the direction of the arrow IIIB of FIG. 3A;

FIG. 4A is a schematic cross-section of a reference master (B2) for use in determining measurement error factors of a gearwheel toothing measuring machine in relation to an internal straight or spur toothing along the line IVA—IVA of FIG. 4B; and FIG. 4B is a plan view of the master (B2) of FIG. 4A, viewed from the direction of the arrow IVB of FIG. 4A.

Figure 1C:
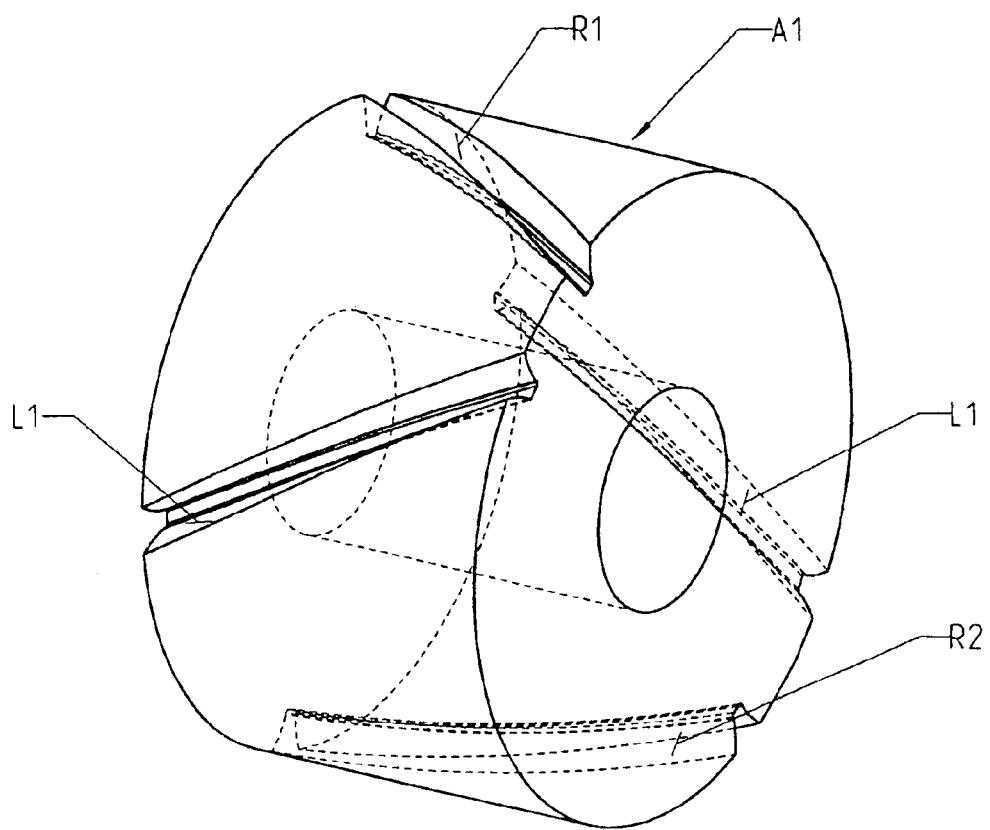
FIG. 1C is a perspective view of the master (A1) of FIG. 1A.
Figure 2C:
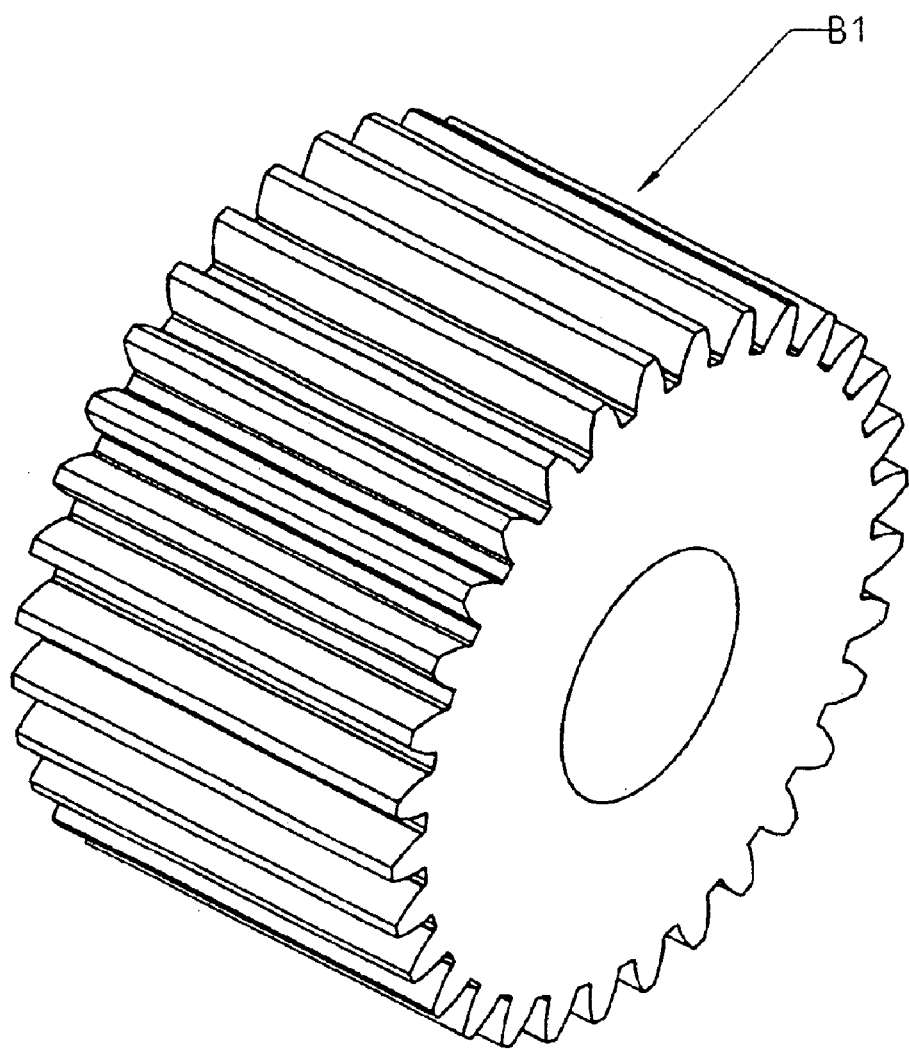
FIG. 2C is a perspective view of the master (B1) of FIG. 2A.

Referring now to the drawings, there is shown in FIGS. 1A to 1C a reference master A1—also termed standard—of measuring means for determining measurement error factors of a measuring machine which measures toothing tolerances of gearwheels by inserting gauging balls of selected diameter in different tooth gaps of a gearwheel and then taking measurements from the positions of the inserted balls. The master A1 is intended for use in determining machine error factors applicable to an externally toothed helical gearwheel with an even or uneven number of teeth and, in particular, factors with respect to not only tooth profile deviation and tooth flank line deviation, but also ball spacing indicative of deviations in diameter.

The master A1 is formed at its external circumference with two first helically extending grooves R1 and R2 which extend in a first helix direction indicated by angle $\beta$ in FIG. 1A and which are arranged diametrically opposite one another, thus on the same diameter. These first grooves represent tooth gaps of an externally toothed helical gearwheel with an even number of teeth and serve to respectively receive two gauging balls (not shown) to enable a spacing measurement—for measurement error factor determination—to be taken between mutually remote points of the inserted balls.

The master A1 is further formed at the same circumference with two second helically extending grooves L1 and L2 which extend on a second helix direction, opposite to the first direction, indicated by the angle $\gamma$ in FIG. 1A and which are arranged on opposite sides of the circumference respectively on two diameters D1 and D2 including therebetween a predetermined angle $\alpha$. These second grooves represent tooth gaps of an externally toothed helical gearwheel with an uneven number of teeth and serve to respectively receive the two balls to again enable a spacing measurement to be taken between mutually remote points of the inserted balls. The angle $\alpha$ corresponds with half the pitch of the teeth of the respective gearwheel toothing.

The first helix direction indicated by the angle $\beta$ can be a righthanded helix direction and the second helix direction indicated by the angle $\gamma$ can be a lefthand helix direction. A converse association is equally possible. The two opposite helix directions allow testing and comparison of the accuracy of the machine in opposite directions of rotation.

The measuring means additionally comprises, as shown in FIGS. 3A and 3B, a reference master A2 intended for use in determining machine error factors applicable to an internally toothed helical gearwheel with an even or uneven number of teeth. The master A2 has, similarly to the master A1, two opposite first helically extending grooves R1 and R2 on the same diameter and two generally opposite second helically extending grooves L1 and L2 respectively on two diameters including therebetween an angle corresponding with the angle $\alpha$ explained with reference to FIG. 1B, the two sets of grooves in this instance being formed on an internal circumference of the master. The utilisation of the grooves in the master A2 is analogous to the utilisation in the master A1, thus respectively for even and uneven numbers of teeth, except that in this instance the spacing measurement for measurement error factor determination is taken between mutually adjacent (closest) points of the inserted balls.

The measurement error factors obtained by test measurements taken from the ball spacings in use of the masters A1 and A2 can be employed to calibrate the machine or a data processing system thereof, for example in conjunction with measurement readings derived during batch testing of gearwheels.

In addition, the measuring means can include two further reference masters B1 and B2, shown in FIGS. 2A, 2B and FIGS. 4A, 4B, each provided with a straight or spur toothing over, respectively, the full external circumference and the full internal circumference. The master B1 is thus used for obtaining measurements applicable to externally toothed spur gearwheels and the master B2 for obtaining measurements applicable to internally toothed spur gearwheels. The masters B1 and B2 can be used for determining not only error factors with respect to tooth profile deviations and flank line deviations of straight-cut toothings, but also error factors with respect to diameter (ball spacing) in straight-cut toothing, as well as individual pitch deviation, overall pitch deviation and concentricity deviation in both spur and helical toothings.

I claim:

1. Measuring means for determining measurement error factors of a measuring machine which measures toothing tolerances of gearwheels by inserting two gauging elements in different tooth gaps of a gearwheel and then taking measurements from the positions of the inserted elements, the measuring means comprising a reference master having two first helically extending grooves disposed on one of an external circumference and an internal circumference of the master and representing tooth gaps for respectively receiving the two gauging elements to permit simulated measurements applicable to one of an externally helically toothed and an internally helically toothed gearwheel with an even number of teeth, the first grooves extending in a first helix direction and being arranged on opposite sides of the circumference on the same diameter, and two second helically extending grooves disposed on the same circumference as the first grooves and representing tooth gaps for respectively receiving the two gauging elements to permit simulated measurements applicable to one of an externally helically toothed and an internally helically toothed gearwheel with an uneven number of teeth, the second grooves extending in a second helix direction opposite to the first helix direction and being arranged on opposite sides of the circumference respectively on two diameters including therebetween a predetermined angle equal to half the pitch of the teeth of the uneven number.

2. Measuring means as claimed in claim 1, wherein the first helix direction is a righthand helix direction and the second helix direction is a lefthand helix direction.

3. Measuring means as claimed in claim 1, wherein the first helix direction is a lefthand helix direction and the second helix direction is a righthand helix direction.

4. Measuring means as claimed in claim 1, comprising a further reference master having a spur toothing extending fully around one of an external circumference and an internal circumference thereof for reception of the gauging elements to permit simulated measurements applicable to one of an externally toothed and an internally toothed gearwheel with a spur toothing.

* * * * *